United States Patent [19]

Masakawa

[11] Patent Number: 5,155,719
[45] Date of Patent: Oct. 13, 1992

[54] OPTICAL INFORMATION RECORDING AND/OR REPRODUCING APPARATUS

[75] Inventor: Yoshihiko Masakawa, Hachioji, Japan

[73] Assignee: Olympus Optical Co., Ltd., Tokyo, Japan

[21] Appl. No.: 526,589

[22] Filed: May 22, 1990

[30] Foreign Application Priority Data

May 23, 1989 [JP] Japan ................... 1-127746

[51] Int. Cl.⁵ .................................. G11B 7/00
[52] U.S. Cl. ............................ 369/48; 369/32; 369/54
[58] Field of Search ............ 369/52, 53, 54, 47, 369/48, 32; 360/76, 77.1, 77.2

[56] References Cited

U.S. PATENT DOCUMENTS

| 4,490,810 | 12/1984 | Hon | 364/410 |
| 4,779,252 | 10/1988 | Custers et al. | 369/32 |
| 4,872,151 | 10/1989 | Smith | 369/32 |

FOREIGN PATENT DOCUMENTS

| 55-52167 | 4/1980 | Japan . |
| 63-103446 | 5/1988 | Japan . |
| 63-108539 | 5/1988 | Japan . |
| 63-161531 | 7/1988 | Japan . |

Primary Examiner—Roy N. Envall, Jr.
Assistant Examiner—Nabil Hindi
Attorney, Agent, or Firm—Stevens, Davis, Miller & Mosher

[57] ABSTRACT

In an apparatus for recording and/or reproducing information on and/or from an optical record medium having a control track in which information for identifying the relevant optical record medium has been recorded, plural sets of operational condition data for various kinds of optical record media which will be set on the apparatus have been previously stored in a memory unit. Information recorded in a control track of an optical record medium set on the apparatus is first read out to identify a kind of the optical record medium, and then a set of operational condition data is selectively read out of the memory unit in accordance with the identified kind of the optical record medium. The writing and/or reading power of a light beam impinging upon the optical record disc is controlled in accordance with the read out operational condition data to effect the recording and/or reproduction in an optimum manner. The operational condition data may further include time duration data of a recording pulse for optical disks which are driven in the constant angular velocity means.

13 Claims, 3 Drawing Sheets

FIG_1

FIG._2

OPTICAL INFORMATION RECORDING AND/OR REPRODUCING APPARATUS

BACKGROUND OF THE INVENTION

Field of the Invention and Related Art Statement

The present invention relates to an optical information recording and/or reproducing apparatus comprising an optical means for projecting a light beam upon an optical record medium, and a driving means for driving the optical record medium with respect to an optical axis of the optical means to effect the information recording and/or reproduction.

Optical record media can be roughly classified into read-only type, write-once type and rewritable type. Each of these different types of record media includes a large sub-varieties whose characteristics are different from each other based upon construction, materials, etc. of each optical record medium.

In order to effect recording and/or reproduction accurately for different optical record media, it is necessary to adjust the power of a laser light beam which is made incident upon the record medium to an optimum value.

In Japanese Patent Application Laid-open Publication Kokai Sho No. 63-103446, there is disclosed an optical information recording and/or reproducing apparatus in which the writing power of the laser light is adjusted in accordance with identifying information provided on a carriage of a record medium, i.e. an optical disk. That is to say, the above information is directly written on the cartridge surface or a label having the information written thereon is applied on the cartridge surface. In Japanese Patent Application Laid-open Publication Kokai Sho No. 63-108539, there is described another known optical information recording and/or reproducing apparatus comprising a detector for reproducing the information recorded on a magnetic tape which is applied on the cartridge of a disk and the writing laser power is controlled in accordance with the information reproduced from the magnetic tape.

In the known optical information recording and/or reproducing apparatuses mentioned above, the operational condition data such as the optimum writing laser power, writing pulse duration and reading, laser power have been recorded on the cartridge of the record medium. Usually the record medium and the cartridge are manufactured separately, so that there might occur that the record medium denoted by the information recorded on the cartridge is not always identical with the actual record medium installed in the cartridge. Moreover, the information recorded on the cartridge is liable to be damaged and stained, and thus the information could not be reproduced correctly.

Further in the write-once type and rewritable type optical record media, there has been proposed to record the information about the optimum laser power, etc. in a control track of an optical record medium in accordance with a proposal (DP9171, DP10089) of ISO (International Organization for Standardization). The operational condition data recorded in the record medium is first read out and the writing laser power is set to the optimum value in accordance therewith. It should be noted that the operational condition may also include the optimum laser power for reading and optimum time durations of recording pulses.

In the above explained known optical information recording and/or reproducing apparatus, the operational condition data such as the optimum writing laser power, optimum reading laser power, writing pulse duration, etc. is recorded. These values are usually selected when the record medium is set on the standard apparatus. However, in practice, the optical information recording and/or reproducing apparatuses have different characteristics, so that the optimum operational conditions for the standard apparatus could not be suitable for particular apparatuses. The optical information recording and/or reproducing apparatuses have optical systems having different NA, laser light source (different wavelengths) and the methods of measuring the laser power are different from each other. Particularly, when optical information recording and/or reproducing apparatuses which use the same optical record medium are manufactured by different makers, the optimum operational conditions differ from each other.

SUMMARY OF THE INVENTION

The present invention has for its object to provide a novel and useful optical information recording and/or reproducing apparatus in which the recording and/or reproducing can be carried out always accurately for various kinds of optical information record mediums.

According to the invention, an optical information recording and/or reproducing apparatus comprises an optical means for projecting a light beam upon an optical record medium;

a driving means for driving the optical record medium with respect to an optical axis of the optical means;

a memory means for storing plural sets of operational condition data for plural kinds of optical information record media to be used in the apparatus;

a detecting means for reading information recorded on a control track of an optical information record, medium set on the apparatus and for identifying the kind of optical information record medium in accordance with the detected information; and a control means for reading a set of operational condition data out of said memory means in accordance with the identified kind of the optical record medium and controlling the recording and/or reproducing operation in accordance with the read out operational condition data.

DETAILED EXPLANATION OF THE PREFERRED EMBODIMENTS

Figure 1:
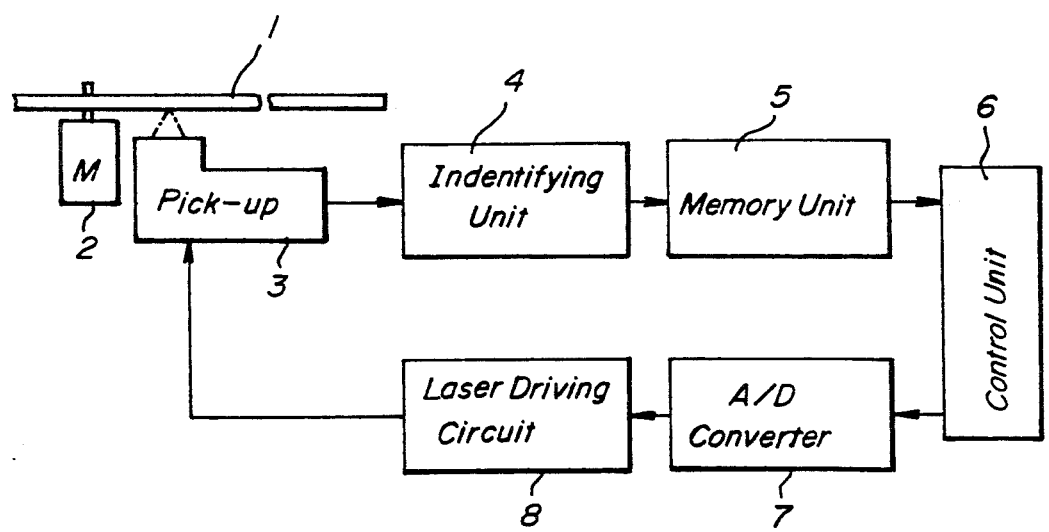
FIG. 1 is a schematic view showing an embodiment of the optical information recording and/or reproducing apparatus according to the invention.

FIG. 1 is a schematic view illustrating an embodiment of the optical information recording and/or reproducing apparatus according to the invention. In the present embodiment, an optical information record disk 1 is set on the apparatus and is rotated by a spindle motor 2 and information recorded in a control track of the optical disk is read out with the aid of an optical pick-up 3. Then, a kind of the optical disk 1 is identified by an identifying unit 4 in accordance with the read out information. A signal representing the detected kind of the optical disc 1 is supplied to a memory unit 5 as an address signal. In the memory unit 5 there have been previously stored plural sets of operational condition data for particular optical disks which are used by the present apparatus. A set of operational condition data related to the relevant optical disk 1 is read out of the memory unit 5 in accordance with the address signal supplied from the identifying unit 4. The operational condition data thus read out is supplied to a control unit 6 including a CPU. The control unit 6 controls operations of various units of the apparatus in accordance with the operational condition data. That is to say, a laser power of laser light emitted by a laser light source provided in the optical pick-up unit 3 is controlled by means of D/A converter 7 and laser driving circuit 8 in accordance with the recording or reproducing operation mode.

In accordance with ISO standard proposal, 4 bytes from 14 bytes to 17 bytes in the control track of the optical disk are not specified and are used as a vender unique area. Usually in this vender unique area there is recorded a name of a manufacture of the disk in ASCII code and when a manufacture makes a plurality of kinds of optical disks, identifying data for identifying a kind of the optical disk is also recorded. In the present embodiment, the kind of the optical disk is identified by utilizing such data stored in the vender unique area of the optical disk.

In the memory unit 5 there have been previously stored plural sets of operational condition data which have been obtained by actually using respective optical disks. For instance, optimum laser power for recording the information, optimum recording pulse widths in dependence on the disk rotating mode (CAV or CLV) and optimum laser power for reading the information out of the optical disk have been derived experimentally and have been stored in the memory unit 5. These plural sets of operational condition data are stored in the memory unit 5 in such a manner that they can be retrieved in accordance with the address signal corresponding to the identifying data read out of the optical disk.

An example of the operational condition data stored in the memory unit 5 is shown in the following table. In this example, optimum recording laser power and recording pulse width are defined for four different optical disks which are rotated in the CAV (constant angular velocity) mode.

TABLE

| Identifying Information | Optimum Recording Power (mW) | Pulse Width (nsec) | | |
|---|---|---|---|---|
| | | Inner | Middle | Outer |
| ABCD | 8 | 60 | 80 | 100 |
| ZAB1 | 7.5 | 70 | 90 | 110 |
| CCC1 | 8.5 | 90 | 90 | 100 |
| CCC2 | 7.5 | 90 | 90 | 110 |

In the above table, four byte identifying information denote the name of the manufacture who made the optical disks and have been recorded in the vender unique area of the control track in ASCII code. CCC1 and CCC2 represent two different kinds of optical disks manufactured by the same disk maker.

Figure 2:
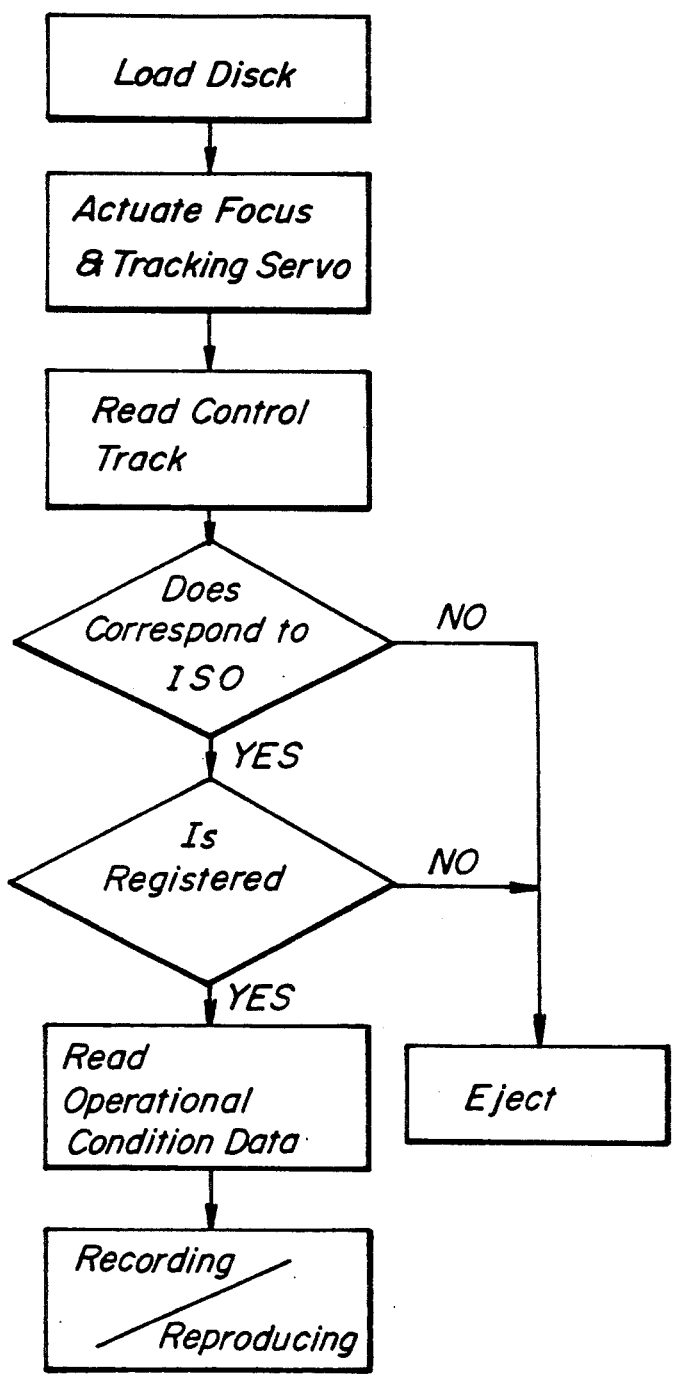
FIG. 2 is a flow chart representing the operation of the apparatus shown in FIG. 1.

Now the operation of the present embodiment will be explained with reference to a flow chart shown in FIG. 2.

At first, the optical disk 1 is set on a turntable and is rotated by the spindle motor 2. Then, the focusing and tracking servo control is turned on to read the information recorded in the control track of the optical disk 11. The read out information is supplied to the identifying unit 4. On the basis of the read out information, it is judged whether or not the optical disk is one corresponding to ISO. When the optical disk 1 is one corresponding to ISO, then the information recorded in the vender unique area of the control track is extracted and it is judged whether or not the relevant optical disk has been registered. That is to say, it is checked whether or not the operational condition data for the relevant optical disk has been stored in the memory unit 5.

When it is confirmed that the optical disk 1 does not correspond to ISO or the operational condition data of the optical disk has not been stored in the memory unit 5, it is difficult to effect the recording and/or reproducing accurately, so that the optical disk 1 is ejected.

Contrary to this, when it is confirmed that the optical disk 1 corresponds to ISO and the operational condition data of the optical disk has been stored in the memory unit 5, the operational condition data is read out of the memory unit 5 and the read out data is supplied to the control unit 6. Then the control unit 6 controls the recording and/or reproducing operation in accordance with the read out operational condition data. That is to say, in the recording mode, the recording power of the laser light is set to the optimum value denoted by the operational condition data by means of the D/A converter 7 and laser driving circuit 8.

As explained above, in the present embodiment a plurality of sets of the operational condition data for various kinds of optical record disks have been experimentally derived by using the actual optical disks and have been stored in the memory unit 5, and the information recorded in the vender unique area of the control track of the optical disk is read out to identify the optical disk. Then a corresponding set of operational condition data is selectively read out of the memory unit 5, and the various units of the apparatus are controlled in accordance with the thus read out operational condition data. Therefore, an optimum recording and reproducing operation can be always achieved.

Figure 3:
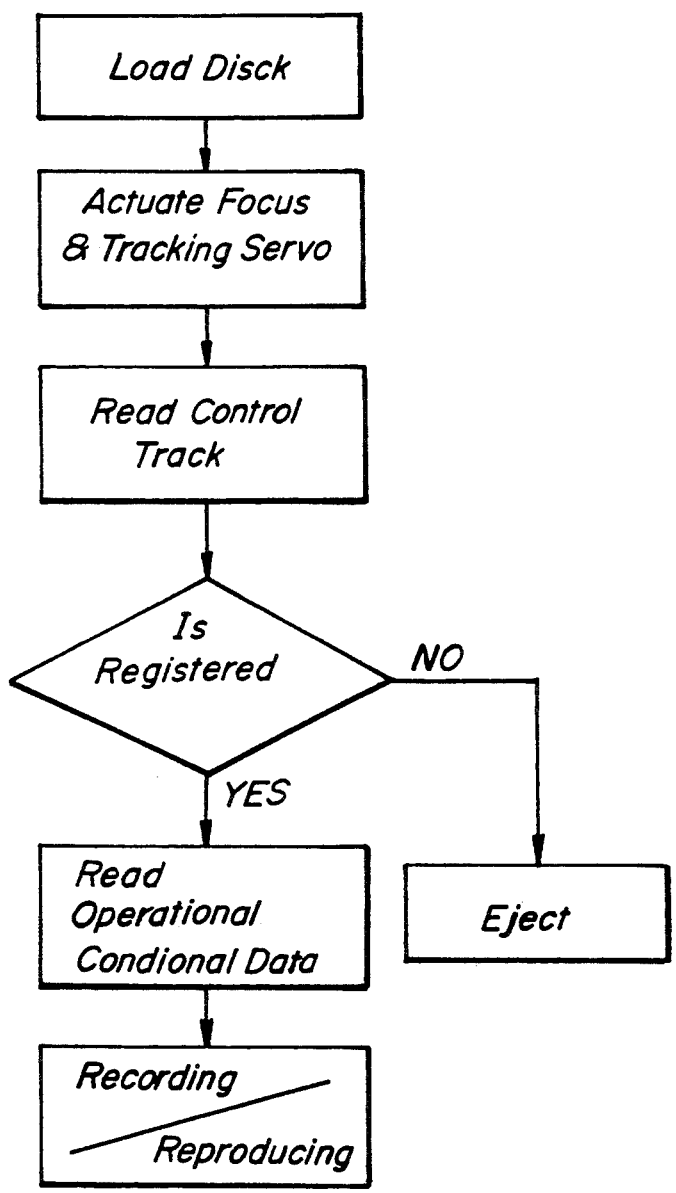
FIG. 3 is a flow chart explaining a modification of the operation of the apparatus according to the invention.

The present invention is not limited to the embodiment explained above, but may be modified in various ways. For instance, in the above embodiment the optical disk is checked to determine whether it corresponds to ISO. However, according to the invention it is not always necessary to effect this check. In this case, the contents of the memory unit 5 may be retrieved in accordance with the identifying information as illustrated in FIG. 3. Further, in the above embodiment the optical record disk is identified in accordance with the information recorded in the vender unique area in the control track of the optical disk, but the identification may be effected by reading information recorded in another data area in the control track or the whole data in the control track. Further in the above embodiment, the optical record medium is an optical disk, but it may be formed by an optical record card. Moreover, the present invention may be applied not only to the once-write type and rewritable type record medium, but also to the read-only type record medium.

As explained above, in the optical information recording and/or reproducing apparatus according to the present invention, a plurality of sets of operational condition data for various kinds of optical record mediums have been experimentally derived by using the actual optical record media and have been stored in the memory unit, and the information recorded in the control track of the optical record medium is read out to identify the optical record medium set on the apparatus. Then, a corresponding set of operational condition data is selectively read out of the memory unit, and the various units of the apparatus are controlled in accordance with the thus read out operational condition data. Therefore, an optimum recording and/or reproducing operation can be always performed accurately.

What is claimed is:

1. An optical information recording and/or reproducing apparatus for use with an optical record medium including at least one data track and a control track storing identification information signifying that the optical record medium is a particular kind among plural kinds of optical record media, said apparatus comprising:
    an optical means for projecting a light beam upon an optical record medium to record/reproduce data on/from the data track and to read said identification information from the control track and for generating an output signal in accordance with a reflected light beam from the optical record medium;
    a driving means for driving the optical record medium with respect to an optical axis of the optical means;
    a memory means for storing data representing said plural kinds of optical record media to be used in the apparatus and plural sets of operational condition data corresponding to said kinds of media;
    an identifying means, receiving said output signal from said optical means, for reading said identification information from said output signal to identify a kind of the optical record medium in accordance with the identification information thus read out; and
    a control means for reading a set of operational condition data out of said memory means in accordance with the identified kind of the optical record medium and controlling a recording operation for recording information on the optical record medium in accordance with the read out operational condition data.

2. An apparatus according to claim 1, wherein said memory unit stores plural sets of operational condition data which have been obtained by effecting the recording and/or reproducing by actually using said plural kinds of optical record media.

3. An apparatus according to claim 2, wherein said operational condition data includes a writing power of the light beam.

4. An apparatus according to claim 3, wherein said operational condition data further includes writing pulse widths.

5. An apparatus according to claim 1, wherein said identifying means is constructed to read information recorded in a vender unique area in the control track.

6. An optical information reproducing apparatus comprising
    an optical means for projecting a light beam upon an optical record medium;
    a driving means for driving the optical record medium with respect to an optical axis of the optical means;
    a memory means for storing data representing plural kinds of optical information record media to be used in the apparatus and plural sets of operational condition data corresponding to said kinds of media;
    an identifying means for reading information recorded on a control track of an optical information record medium set on the apparatus and for identifying a kind of the optical information record medium in accordance with the information thus read out;
    a control means for reading a set of operational condition data out of said memory means in accordance with the identified kind of the optical record medium and controlling a recording and/or reproducing operation in accordance with the read out operational condition data; and
    an ejecting means for ejecting an optical record medium set on the apparatus when it is confirmed that a set of operational condition data for the relevant optical record medium is not stored in the memory means.

7. An apparatus according to claim 6, wherein said operational condition data includes a reading power of the light beam.

8. An apparatus according to claim 6, wherein said memory unit stores plural sets of operational condition data which have been obtained by effecting the recording and/or reproducing by actually using said plural kinds of optical record media.

9. An apparatus according to claim 8, wherein said operational condition data includes a writing power of the light beam.

10. An apparatus according to claim 9, wherein said operation condition data further includes writing pulse widths.

11. An apparatus according to claim 8, wherein said operational condition data includes a reading power of the light beam.

12. An apparatus according to claim 9, wherein said operational condition data includes a reading power of the light beam.

13. An apparatus according to claim 6, wherein said identifying means comprises means for reading information recorded in a vender unique area in the control track.

* * * * *

UNITED STATES PATENT AND TRADEMARK OFFICE
CERTIFICATE OF CORRECTION

PATENT NO.    : 5,155,719 C1                                    Page 1 of 1
DATED         : June 10, 2003
INVENTOR(S)   : Yoshihiko Masakawa It is certified that error appears in the above-identified patent and that said Letters Patent is hereby corrected as shown below:

Column 1,
Line 30, "an" (second occurrence) should read -- the --.

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 5,155,719 C1  Page 1 of 1
DATED : June 10, 2003
INVENTOR(S) : Yoshihiko Masakawa It is certified that error appears in the above-identified patent and that said Letters Patent is hereby corrected as shown below:

Column 1,
Line 30, "an" (second occurrence) should read -- the --.
Line 43, "media" should read -- optical record media --.

This certificate supersedes Certificate of Correction issued November 25, 2003.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 5,155,719 C1
DATED : June 10, 2003
INVENTOR(S) : Yoshihiko Masakawa It is certified that error appears in the above-identified patent and that said Letters Patent is hereby corrected as shown below:

Column 1,
Line 30, "an" (second occurrence) should read -- the --.
Line 43, "media" should read -- optical record media --.

This certificate supersedes Certificate of Correction issued November 25, 2003, and February 17, 2004.

Signed and Sealed this

Nineteenth Day of October, 2004

JON W. DUDAS
*Director of the United States Patent and Trademark Office*

(12) REEXAMINATION CERTIFICATE (4793rd)
United States Patent
Masakawa

(10) Number: US 5,155,719 C1
(45) Certificate Issued: Jun. 10, 2003

(54) OPTICAL INFORMATION RECORDING AND/OR REPRODUCTION APPARATUS

(75) Inventor: Yoshihiko Masakawa, Hachioji (JP)

(73) Assignee: Olympus Optical Co., Ltd., Tokyo (JP)

Reexamination Request:
No. 90/006,133, Oct. 23, 2001

Reexamination Certificate for:
Patent No.: 5,155,719
Issued: Oct. 13, 1992
Appl. No.: 07/526,589
Filed: May 22, 1990

(30) Foreign Application Priority Data

May 23, 1989 (JP) .............................................. 1-127746

(51) Int. Cl.[7] ................................................. G11B 7/00
(52) U.S. Cl. .................................... 369/47.52; 369/116
(58) Field of Search .......................... 369/53.2, 53.22, 369/53.23, 53.31, 47.51, 47.52, 47.55, 116

(56) References Cited

U.S. PATENT DOCUMENTS

| | | |
|---|---|---|
| 4,789,975 A | 12/1988 | Taniyama |
| 4,853,915 A | 8/1989 | Takasago et al. |
| 4,989,195 A | 1/1991 | Suzuki |
| 5,005,164 A | 4/1991 | Sakamoto et al. |

FOREIGN PATENT DOCUMENTS

JP 64-14731 1/1989

*Primary Examiner*—Thang V. Tran

(57) ABSTRACT

In an apparatus for recording and/or reproducing information on and/or from an optical record medium having a control track in which information for identifying the relevant optical record medium has been recorded, plural sets of operational condition data for various kinds of optical record media which will be set on the apparatus have been previously stored in a memory unit. Information recorded in a control track of an optical record medium set on the apparatus is first read out to identify a kind of the optical record medium, and then a set of operational condition data is selectively read out of the memory unit in accordance with the identified kind of the optical record medium. The writing and/or reading power of a light beam impinging upon the optical record disc is controlled in accordance with the read out operational condition data to effect the recording and/or reproduction in an optimum manner. The operational condition data may further include time duration data of a recording pulse for optical disks which are driven in the constant angular velocity means.

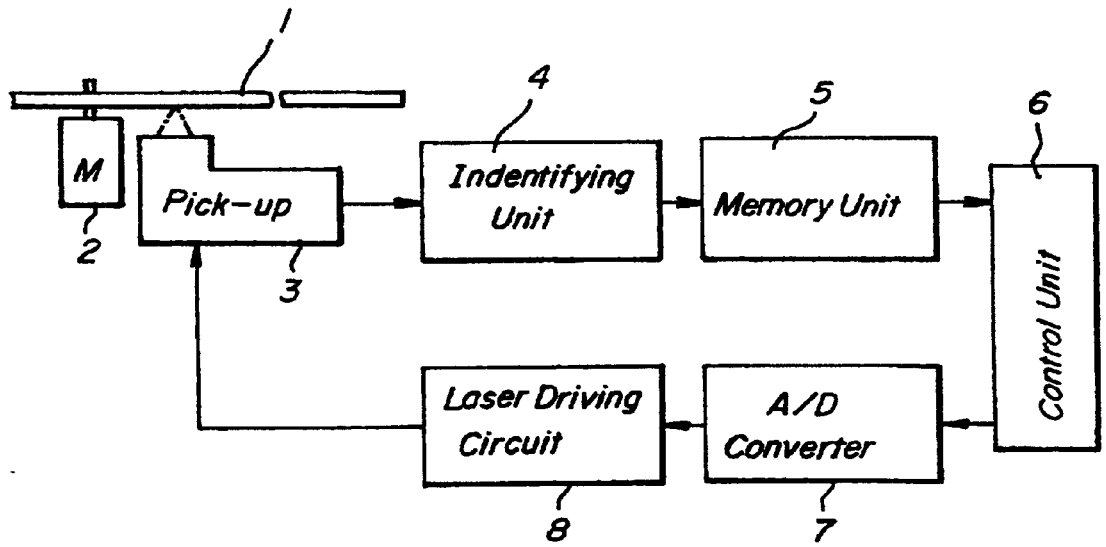

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6–13 are cancelled.

Claim 1 is determined to be patentable as amended.

Claims 2–5, dependent on an amended claim, are determined to be patentable.

New claims 14–33 are added and determined to be patentable.

1. An optical information recording [and/or] *and* reproducing apparatus for use with an optical record medium including at least one data track and a control track storing identification information signifying that the optical record medium is a particular kind among plural kinds of optical record media, said apparatus comprising:
   an optical means for projecting a light beam upon an optical record medium to record/reproduce data on/from the data track and to read said identification information from the control track and for generating an output signal in accordance with a reflected light beam from the optical record medium, *wherein said identification information includes at least information identifying a maker of said optical record medium*;
   a driving means for driving the optical record medium with respect to an optical axis of the optical means;
   a memory means for storing data representing said plural kinds of optical record media to be used in the apparatus and plural sets of operational condition data corresponding to said kinds of media;
   an identifying means, receiving said output signal from said optical means, for reading said identification information from said output signal to identify a kind of the optical record medium in accordance with the identification information thus read out; and
   a control means for reading a set of operational condition data out of said memory means in accordance with the identified kind of the optical record medium and controlling a recording operation for recording information on the optical record medium in accordance with the read out operational condition data.

14. *An apparatus according to claim 1, wherein said identification information is recorded in said control track as 4 byte data.*

15. *An apparatus according to claim 1, wherein said operational condition data include at least information representing a recording power of a light beam.*

16. *An apparatus according to claim 1, wherein said memory means stores data identifying a maker of said optical record medium.*

17. *An apparatus according to claim 1, wherein said operational condition data include information representing a rotating mode of said optical record medium.*

18. *An apparatus according to claim 17, wherein said rotating mode of said optical record medium is a CAV mode.*

19. *An apparatus according to claim 17, wherein said rotating mode of said optical record medium is a CLV mode.*

20. *An apparatus according to claim 1, wherein said optical axis of the optical means is an optical axis of the light beam projected upon the optical record medium, said driving means comprising a spindle motor, and said spindle motor and said optical means being arranged on a same side with reference to said optical record medium.*

21. *An optical information recording and reproducing apparatus for use with an optical record medium including at least one data track and a control track storing identification information signifying that the optical record medium is a particular kind among plural kinds of optical record media, said apparatus comprising:*
   *an optical means for projecting a light beam upon the optical record medium to record/reproduce data on/from the data track and to read said identification information from the control track and for generating an output signal in accordance with a reflected light beam from the optical record medium, wherein said identification information signifies at least that said optical record medium is a particular kind among plural kinds of optical record media made by a same maker;*
   *a driving means for driving the optical record medium with respect to an optical axis of the optical means;*
   *a memory means for storing data representing said plural kinds of optical record media to be used in the apparatus and plural sets of operational condition data corresponding to said kinds of optical record media;*
   *an identifying means, receiving said output signal from said optical means, for reading said identification information from said output signal to identity a kind of the optical record medium in accordance with the identification information thus read out; and*
   *a control means for reading a set of operational condition data out of said memory means in accordance with the identified kind of the optical record medium and controlling a recording operation for recording information on the optical record medium in accordance with the read out operational condition data.*

22. *An apparatus according to claim 21, wherein said memory means stores plural sets of operational condition data which have been obtained by effecting the recording and/or reproducing by actually using said plural kinds of optical record media.*

23. *An apparatus according to claim 22, wherein said operational condition data includes a writing power of the light beam.*

24. *An apparatus according to claim 23, wherein said operational condition data further includes writing pulse widths.*

25. *An apparatus according to claim 21, wherein said identifying means comprises means for reading information recorded in a vender unique area in the control track.*

26. *An apparatus according to claim 21, wherein said identification information is recorded in said control track as 4 bytes data.*

27. *An apparatus according to claim 26, wherein said 4 bytes data corresponds to four bytes from 14 bytes to 17 bytes in said control track.*

28. *An apparatus according to claim 21, wherein said operational condition data include information representing a recording power of a light beam.*

29. *An apparatus according to claim 21, wherein said operational condition data include information representing a rotating mode of said optical record medium.*

30. *An apparatus according to claim 29, wherein said rotating mode of said optical record medium is a CAV mode.*

31. *An apparatus according to claim 21, wherein said identification information includes data identifying said maker of said optical record medium.*

32. An apparatus according to claim 21, wherein the data identifying said maker of said optical record medium is stored in said memory means.

33. An apparatus according to claim 21, wherein said optical axis of the optical means is an optical axis of the light beam projected upon the optical record medium, said driving means comprising a spindle motor, and said spindle motor and said optical means being arranged on a same side with reference to said optical record medium.

\* \* \* \* \*